United States Patent
Zarkhin et al.

(10) Patent No.: US 10,298,040 B2
(45) Date of Patent: May 21, 2019

(54) TIMER-BASED THERMAL PROTECTION FOR POWER COMPONENTS OF A SWITCH MODE POWER SUPPLY

(71) Applicant: Continental Automotive Systems, Inc., Auburn Hills, MI (US)

(72) Inventors: Mikhail Zarkhin, West Bloomfield, MI (US); Alfons Fisch, Falkenstein (DE)

(73) Assignee: Continental Automotive Systems, Inc., Auburn Hills, MI (US)

(*) Notice: Subject to any disclaimer, the term of this patent is extended or adjusted under 35 U.S.C. 154(b) by 258 days.

(21) Appl. No.: 15/273,804

(22) Filed: Sep. 23, 2016

(65) Prior Publication Data

US 2018/0090963 A1    Mar. 29, 2018

(51) Int. Cl.

| | |
|---|---|
| *B60L 1/00* | (2006.01) |
| *B60L 3/04* | (2006.01) |
| *H02H 3/08* | (2006.01) |
| *H02H 3/24* | (2006.01) |
| *H02H 5/04* | (2006.01) |
| *H02J 7/00* | (2006.01) |
| *H02M 1/08* | (2006.01) |
| *H02M 1/32* | (2007.01) |
| *G05B 15/02* | (2006.01) |

(52) U.S. Cl.
CPC ............ *H02J 7/0065* (2013.01); *B60L 1/00* (2013.01); *B60L 3/04* (2013.01); *G05B 15/02* (2013.01); *H02H 3/08* (2013.01); *H02H 3/243* (2013.01); *H02H 5/04* (2013.01); *H02H 5/041* (2013.01); *H02H 5/044* (2013.01); *H02J 7/00* (2013.01); *H02J 7/0029* (2013.01); *H02M 1/08* (2013.01); *H02M 1/32* (2013.01); *B60L 2210/10* (2013.01); *B60L 2240/525* (2013.01); *B60L 2240/527* (2013.01); *B60L 2260/165* (2013.01); *H02M 2001/327* (2013.01); *Y02T 10/7216* (2013.01)

(58) Field of Classification Search
None
See application file for complete search history.

(56) References Cited

U.S. PATENT DOCUMENTS

| | | |
|---|---|---|
| 4,055,790 A | 10/1977 | Gerding et al. |
| 6,868,318 B1 | 3/2005 | Cawthorne et al. |
| 7,149,098 B1 | 12/2006 | Chen |
| 2011/0127974 A1 | 6/2011 | Fukushi |
| 2012/0146614 A1 | 6/2012 | Takahashi et al. |
| 2014/0313643 A1 | 10/2014 | Westrick, Jr. et al. |
| 2015/0085540 A1 | 3/2015 | Huang et al. |

FOREIGN PATENT DOCUMENTS

JP    H0715953 A    1/1995

OTHER PUBLICATIONS

International Search Reort and the Written Opinion of the International Searching Authority dated Sep. 22, 2017 for corresponding PCT application No. PCT/US2017/052934.
Great Britain Intellectual Property Office Search Report dated Mar. 13, 2017 for corresponding application No. GB1617123.3.

*Primary Examiner* — Qing Yuan Wu

(57) ABSTRACT

The maximum time that external components of a switch mode power supply over-conduct is determined by an actual ambient temperature at which the devices are operating before they are turned on. Their operation time is thus extended when temperatures are low and decreased when temperatures are high.

20 Claims, 2 Drawing Sheets

TIMER-BASED THERMAL PROTECTION FOR POWER COMPONENTS OF A SWITCH MODE POWER SUPPLY

BACKGROUND

Switch mode power supplies are well known. They typically comprise or include an integrated circuit controller, inductors, capacitors and high current-carrying semi-conductors, typically diodes and field effective transistors (FET), which are controlled by the integrated circuit controller to switch and dissipate large amounts of power. With the exception of so-called smart MOSFETs, the diodes and FETs commonly used with switch mode power supplies do not have thermal protection and are susceptible to thermal damage.

A well-known feature of switch mode power supplies is their ability to provide a relatively constant output voltage, even when an input voltage to the supply is low or falling. In "automotive" applications, switch mode power supplies are often required to operate when a vehicle's storage battery terminal voltage is very low, e.g., about three volts, as often happens during engine cranking. When the terminal voltage of a storage battery voltage in a vehicle goes low, a switch mode power supply must then be able to carry correspondingly large amounts of input current in order to maintain its output voltage. Stated another way, in order to maintain a constant output power, the average input current to a switch mode power supply may have to increase substantially, if only for short periods of time.

It is also well known that switch mode power supply efficiency can decrease as the input voltage to the supply decreases. Efficiency losses further increase the average input current required to provide a constant output voltage.

Excessive power dissipation caused by excessive current flow through a semi-conductors of a switch mode power supply will cause the device to fail prematurely. If such devices do not have their own thermal protection, they will eventually be destroyed.

Prior art switch mode power supplies employ three different techniques to avoid destroying a semi-conductor by excessive heat dissipation caused by current flow. One solution is to over-size the external power components or over-design the heat sync for the devices such that the semi-conductors can operate indefinitely under worst case conditions. An obvious drawback of such a solution is the increased size and cost of external power components beyond what is necessary and is often an unacceptable solution where cost and physical size of an electronic circuit is important.

Another prior art solution to protecting devices from over temperature is to provide semi-conductors with their own built-in thermal protection. Many semi-conductor manufacturers offer so-called "smart MOSFETs" with built-in thermal shutdown mechanisms. These components are more expensive than unprotected MOSFETs and for that reason, using them is often undesirable.

A third method of protecting semi-conductors from over temperature destruction is to limit the time that they operate at an excessive input current in order to limit their temperature rise. Operating parameters of the power supply are used to determine the power dissipation on the external power components above typical values. A timer is started that determines the amount of time that the external components can be used before the power supply is shut off. When the timer reaches its predetermined maximum count, power to the semi-conductors is shut off, preventing them from destruction.

With regard to the third solution, a method and apparatus for optimizing or maximizing the time during which semi-conductors can be operated without destruction would be an improvement over the prior art.

DETAILED DESCRIPTION

Figure 1:
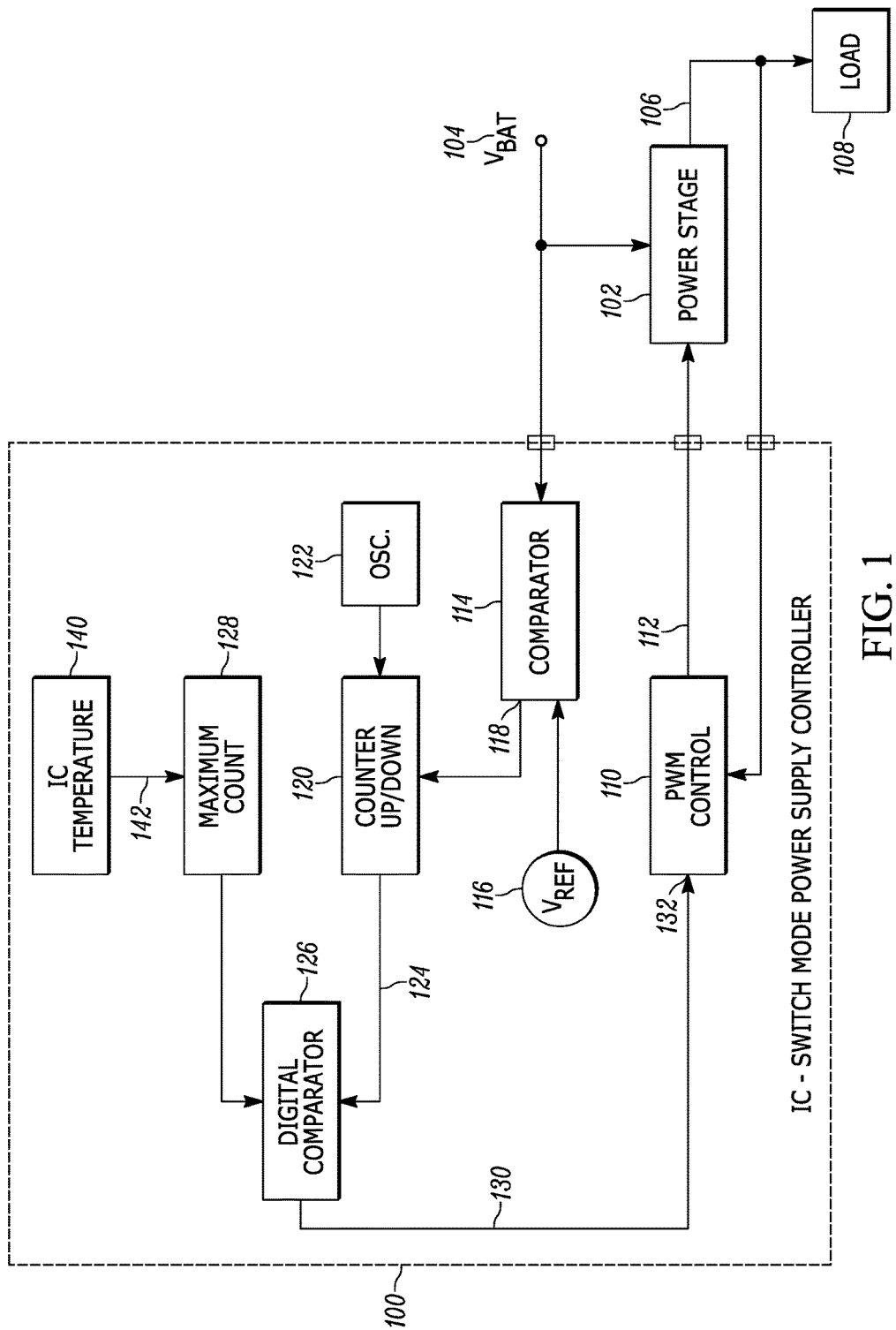
FIG. 1 is a block diagram of a switch mode power supply having timer-based thermal protection for the power components of the supply.

FIG. 1 depicts a switch mode power supply 100. The power supply 100 comprises a "power stage" 102 typically comprised of high-current carrying inductors, diodes, field effect transistors (FETs) and capacitors that receive electrical energy from a vehicle battery 104. The battery of course has a nominal output voltage and it provides that voltage to the input of the power supply 100, which converts it to voltage 106 necessary to operate a load 108, typically an engine controller unit or ECU. The ECU controls an engine and other components of a motor vehicle.

The power stage FETs 102 are turned on and off by voltages applied to their gate terminals. Such voltages are considered to be control signals and in FIG. 1, they are received from a pulse width modulation (PWM) controller 110. The output signals 112 from the PWM controller 110 turn the power stage transistors 102 on and off at a rate and duty cycle by which the output voltage 106 can be maintained relatively constant, even while the battery voltage 104 is low or decreasing.

The battery voltage 104 is also provided to a conventional analog voltage comparator 114. The comparator 114 compares the actual battery voltage 104 to a reference voltage 116 and, when the battery voltage 104 drops below the reference voltage 116, the comparator's output 118 controls (starts and stops) a timer or counter 120 operatively coupled to an oscillator 122 which provides timing pulses to the counter 120.

Put simply, the timer, or counter, 120 provides a measurement of an amount of time that elapses after the input signal 118 from the comparator is asserted and received by the counter 120. The output 124 of the counter 120 is a digital value that is provided to a digital comparator 126. The digital comparator 126, which can be embodied as either a processor or combinational logic, compares the output 124 of the counter 120 to a maximum count value 128. When the counter value 124 exceeds the maximum count value 128, the digital comparator 126 provides an "inhibit" signal 130 to a control input 132 of the controller 110. The signal 130 of the digital comparator 126 to the controller 110 causes the controller 110 to provide an output signal 112 to the transistors of the power stage 102, which causes the high current carrying-transistors to shut off, preventing them from overheating.

Stated another way, when the battery voltage 104 is below or less than a reference voltage 116, a counter 120 is started. When the elapsed time as measured by the counter 120 is equals or exceeds a maximum value, which is loaded into a maximum counter register 128, the transistors of the power stage 102 are shut off. The circuitry depicted in FIG. 1 thus limits the amount of time that the transistors of the power stage 102 are allowed to conduct when the battery voltage 104 goes below some pre-determined value loaded into the maximum count register 128.

An improved thermal protection circuit which maximizes the time that the transistors of the power stage 102 can over-conduct is provided by an ambient temperature sensor 140 that provides a digital output count value 142 to the maximum count register 128. The ambient temperature sensor thus effectively determines the maximum amount of time that the transistors of the power stage 102 can conduct current as a function of temperature. A thermal protection circuit can thus be considered to comprise the counter 120, the maximum count register 128, the digital comparator 126 and the ambient temperature sensor 140.

Providing a digital count value 142 to a maximum count register 128 that corresponds to a temperature can be accomplished a number of conventional ways. By way of example, a voltage provided by a conventional temperature sensor, e.g., a PN junction voltage, can be converted to a digital value by a conventional A/D converter. The digital value from an A/D converter can be provided directly to the maximum count register 128 or have its value offset or "adjusted" up or down (increased or decreased) using conventional digital logic circuitry or a processor.

As used herein, the term "real time" refers to the actual time during which something takes place.

Figure 2:
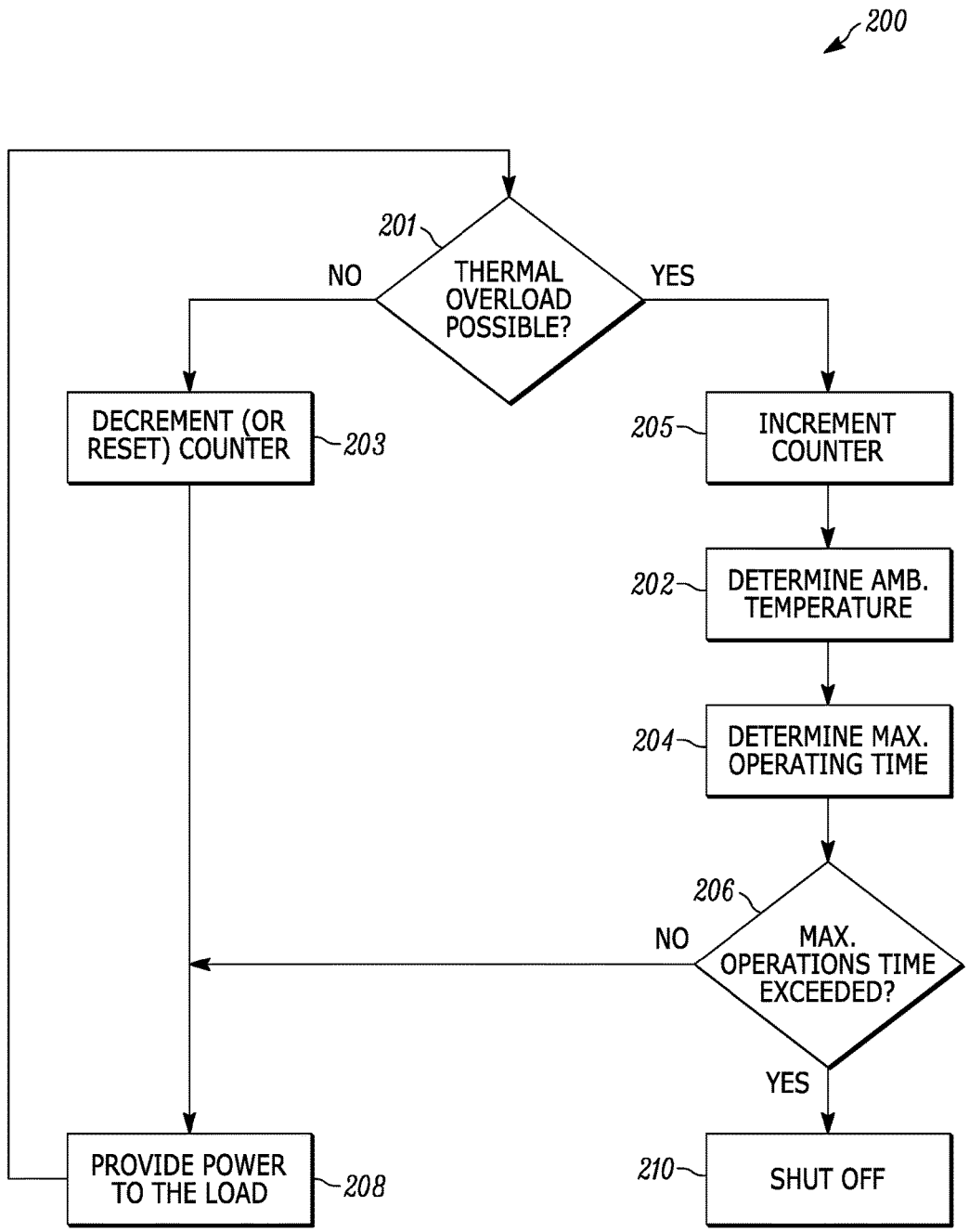
FIG. 2 depicts steps of a method of protecting external power components of a switch mode power supply from thermal damage.

FIG. 2 depicts steps of a method 200 for protecting the external power components of a switch mode power supply from thermal damage. The method 200 comprises a first step 201, which comprises determining, if thermal overload of the power stage components is possible (for example, battery voltage level is below predetermined threshold). In case thermal overload is not possible, the timer is decremented (or reset) and no action is taken to shut off the components of the power stage 208. In case thermal overload is possible, a timer is enabled 205, and an ambient temperature value is obtained at step 202 in real time. The ambient temperature is used to generate or create a digital value corresponding to a maximum amount of time that the current-carrying FETs of a switch mode power supply can conduct current. In alternate embodiments, a loop counter can be incremented or decremented until a value is reached with the elapsed time that the FETs are on being effectively determined by the rate or speed at which the loop counter runs.

At step 204, a determination is made of the maximum amount of time to allow over-current to flow through the power switching transistors of the switch mode power supply using a counter value obtained using the ambient temperature. At step 206, current is allowed to flow through the transistors until the maximum over-current time is exceeded or equaled.

Current is provided to the load at step 208 until the maximum over-current time is exceeded. In embodiments where a loop counter is used, current is provided until the loop counter terminates.

When the maximum over-current time is met or exceeded, or the loop counter terminates, current to the load is shut off at step 210, preventing the external switch mode power supply transistors from thermal damage, the amount of time being dependent upon the ambient temperature at which the transistors are being operated.

The method, as well as the apparatus, described herein extends or reduces the time that over-current is provided to external transistors of a switch mode power supply according to their actual operating conditions, i.e., according to the ambient temperature at which they start conducting current. When ambient temperatures are very low, the time that the external switch mode power supply transistors can be operated is extended. Conversely, when ambient temperatures are high, the switch mode transistors are disabled before they are damaged much sooner.

Those of ordinary skill in the art should recognize that the field effect transistors that comprise the power stage 102 are three-terminal devices. The devices' drain terminal is typically connected to the battery; the source terminal is typically connected to the load. The gate, however, and which controls the FETs, is coupled to the output of the controller 110. The gate voltage applied to the FETs thus determines whether the transistors are on and conductive or off and non-conductive.

As is well-known, the frequency and the duty cycle of the transistors of a switch mode power supply enable the transistors of the power stage to provide current to the load at a voltage that is substantially independent of the battery voltage 104. The processor 110 thus determines the frequency and duty cycle of the signals provided to the control inputs, i.e. the gate terminals, of the transistors of the power stage 102.

In a preferred embodiment, the maximum count register 128 is embodied as a series of D-type flip flops. It can also be embodied as a location in a memory device.

In the preferred embodiment, the ambient temperature sensor 140 is embodied as a diode formed on the same semi-conductor die as the other components shown in FIG. 1. A diode is well-known to have a P-N junction voltage dependent upon its temperature.

The foregoing description is for purposes of illustration only. The true scope of the invention is set forth in the following claims.

What is claimed is:

1. A switch-mode power supply comprising:
a transistor, configured to provide current to a load from a battery having an output voltage, the output voltage from the battery changing responsive to load applied to the battery through the transistor, the transistor having an input node, which is coupled to the battery, an output node that is coupled to the load and a control node, wherein signals applied to the control node determine whether the transistor is on and conductive or, off and non-conductive;
a processor having a control input and an output coupled to the control node of the transistor, the processor being configured to switch the transistor on and off and thereby control the transistor to provide current to the load, an output voltage at the output node of the transistor provided to the load being independent of an input voltage at the input node of the transistor from the battery but dependent on an amount of current flowing through the transistor from the battery, the processor additionally configured to shut off the transistor responsive to an inhibit signal received by the processor at the processor's control input;
a thermal protection circuit coupled to the processor's control input, the thermal protection circuit comprising an ambient temperature sensor, a counter and a comparator, the thermal protection circuit being configured to provide a the inhibit signal to the processor responsive to:
an ambient temperature as determined by the ambient temperature sensor;
the output voltage of the battery; and an amount of time that the transistor is on and providing current to the load.

2. The switch mode power supply of claim 1, wherein the thermal protection circuit is configured to set a time which the inhibit signal is provided to the processor responsive to the ambient temperature to cause the processor to shut off the transistor.

3. The switch mode power supply of claim 1, wherein the counter is configured to count up and to one of reset and count down.

4. The switch mode power supply of claim 1, wherein the counter is a timer.

5. The switch mode power supply of claim 1, wherein the thermal protection circuit comprises:
a maximum count register,
wherein the comparator is operatively coupled to the counter and the maximum count register, the comparator having an output terminal which is configured to provide the inhibit signal to the processor;
wherein the maximum count register holds a count value which is determined by the ambient temperature.

6. The switch mode power supply of claim 5, further comprising:
a second comparator having a first input coupled to the input node of the transistor, a second input and an output, wherein the counter has a first input coupled to the output of the second comparator, a second input for receiving an oscillating signal and an output, the output of the counter is coupled to an input of the comparator, the comparator comparing the output of the counter with the count value of the maximum count register.

7. The switch mode power supply of claim 5, wherein the counter maintains a second count value that is based at least in part upon a voltage at the control input of the transistor, wherein the comparator compares the count value of the maximum count register with the output of the counter.

8. The switch mode power supply of claim 7, wherein the counter increments or decrements responsive at least in part upon the voltage at the control input of the transistor.

9. The switch mode power supply of claim 1, wherein the thermal protection circuit comprises a loop counter and wherein the thermal protection circuit is configured to limit the amount of time that the transistor is on by a count limit determined by the loop counter.

10. The switch mode power supply of claim 1, wherein the processor is formed on a semiconductor die, and wherein the thermal protection circuit comprises a semiconductor device that is also formed on the semiconductor die.

11. A method of protecting external power components of a switch mode power supply from thermal damage, the method comprising:
determining an ambient temperature in real time;
determining a maximum length of time to permit current to flow through the external power components using the ambient temperature;
providing current to a load through the external power components and, starting a timer when a voltage of a battery, to which the external power components are coupled, falls below a predetermined voltage level;
comparing an elapsed time as measured by the timer to the maximum length of time determined from the ambient temperature; and
shutting off current to the load through the external power components when the elapsed time equals or exceeds the maximum length of time determined from the ambient temperature.

12. The method of claim 11, wherein the step of determining a maximum length of time to permit current to flow through the external power components using the ambient temperature comprises obtaining a maximum length of time from a table of time values, which are indexed in the table by ambient temperature values.

13. The method of claim 11, wherein the step of determining a maximum length of time to permit current to flow through the external power components using the ambient temperature comprises, evaluating an equation that correlates a maximum length of time to ambient temperatures.

14. The method of claim 11, wherein the step of determining a maximum length of time to permit current to flow through the external power components using the ambient temperature comprises determining a maximum length of time using a loop counter.

15. A switch-mode power supply comprising:
a transistor configured to provide current to a load from a battery having an output voltage, the output voltage from the battery changing responsive to load applied to the battery through the transistor, the transistor having a first node, which is coupled to the battery, a second node that is coupled to the load and a control node, wherein a voltage applied to the control node at least partly determines whether the transistor is on and conductive or off and non-conductive;
a processor having a control input and an output coupled to the control node of the transistor, the processor being configured to switch the transistor on and off and thereby control the transistor to provide current to the load, the processor additionally configured to shut off the transistor responsive to an inhibit signal received by the processor at the processor's control input;
a thermal protection circuit coupled to the processor's control input, the thermal protection circuit comprising an ambient temperature sensor, a counter and a first comparator, the thermal protection circuit being configured to provide the inhibit signal to the processor responsive to:
an ambient temperature as determined by the ambient temperature sensor;
the battery output voltage; and
the amount of time that the transistor is on and providing current to the load.

16. The switch-mode power supply of claim 15, wherein the thermal protection circuit further comprises data storage for storing a maximum count value, wherein the first comparator is operatively coupled to an output of the counter and the data storage, the first comparator having an output which generates the inhibit signal.

17. The switch-mode power supply of claim 16, wherein the ambient temperature sensor is coupled to the data storage such that the maximum count value is based upon an output of the ambient temperature sensor.

18. The switch mode power supply of claim 16, further comprising a second comparator having a first input coupled to the first node of the transistor, a second input node and an output, wherein the counter has a first input coupled to the output of the second comparator, a second input for receiving a clock signal and an output, the output of the counter is coupled to an input of the first comparator, the first comparator comparing the output of the counter with the maximum count value stored in the data storage.

19. The switch mode power supply of claim 18, wherein the data storage comprises a register, the second input node of the second comparator is coupled to a reference voltage, and the processor comprises a pulse width modulation controller which generates a pulse width modulated signal appearing at the output of the pulse width controller.

20. The switch mode power supply of claim 15, wherein the counter counts when the battery output voltage falls below a predetermined voltage threshold, and an output of the counter corresponds to the amount of time that the transistor is on and providing current to the load since the battery output voltage fell below the predetermined voltage threshold.

\* \* \* \* \*